United States Patent [19]

Iwase et al.

[11] Patent Number: 4,480,456

[45] Date of Patent: Nov. 6, 1984

[54] METHOD AND APPARATUS FOR CUTTING CONTINUOUS CORRUGATED MEMBERS

[75] Inventors: Takatoshi Iwase, Anjo; Kazunari Fuma, Toyota; Akira Nakagawa, Kariya; Kouhei Hakamada, Toyota, all of Japan

[73] Assignee: Nippondenso Co., Ltd., Kariya, Japan

[21] Appl. No.: 396,362

[22] Filed: Jul. 8, 1982

[51] Int. Cl.³ .............................................. B21D 43/28
[52] U.S. Cl. ..................................... 72/185; 83/298; 83/309; 83/318
[58] Field of Search ................... 72/185, 187; 83/295, 83/298, 309, 318, 320

[56] References Cited

U.S. PATENT DOCUMENTS

| | | | |
|---|---|---|---|
| 2,975,817 | 3/1961 | Neff | 72/185 |
| 4,027,517 | 6/1977 | Bodnar | 72/185 |
| 4,165,665 | 8/1979 | Shimizu et al. | 83/318 |

*Primary Examiner*—Lowell A. Larson
*Attorney, Agent, or Firm*—Cushman, Darby & Cushman

[57] ABSTRACT

Cutting of a corrugated fin into predetermined lengths for a radiator in a vehicle. The phase mating is, when the cutter is moved in the direction opposite to the corrugated member, effected at the correcting point where the torque in the cutter is the same as the torque at a cutting point where the corrugated member is moved synchronizingly with the cutter. Thus, automatic phase mating is effected, thereby causing the fin to be cut precisely at a trough of the fin.

22 Claims, 15 Drawing Figures

(A) FIN
(B) CHAIN
(C) FIN PULSE
(D) FIN TROUGH PULSE

Fig. 12

METHOD AND APPARATUS FOR CUTTING CONTINUOUS CORRUGATED MEMBERS

BACKGROUND OF THE INVENTION

1. Field of the Invention

The present invention relates to a method and apparatus for cutting a continuous corrugated member composed of a thin plate, for example, a louver forming corrugated fin for a heat exchanger, for example, a radiator.

2. Description of the Prior Art

In the previously known technique for cutting a corrugated fin, a worm gear is engaged with a crest of the corrugated fin for force feeding. A cutter is operated when the fin is fed to the necessary number of crests. However, the fin displays poor rigidity when passed through a chute. The resultant slight changes in the resisting force tend to cause pitch unevenness. As a result, the worm becomes disengaged, making impossible to cut the fin precisely at the trough. This defect becomes conspicuous when the feed speed is increased. Furthermore, since the fin is louver-formed, pitch unevenness is readily caused by adhesion of the louver to the worm. Moreover, the cutter has to be brought down and up in one pass of a crest of the corrugated member. The speed of this operation, however, is inherently limited by the cam mechanism for driving the cutter. Therefore, it is impossible to increase the speed of the cutting operation beyond a certain limit.

SUMMARY OF THE INVENTION

With such a background, it is the primary object of the present invention to provide a technique by which the speed of cutting a continuous corrugated member is remarkably increased while eliminating the foregoing defects of the conventional technique.

According to one aspect of the present invention, a method for cutting continuous corrugated members, is provided, comprising the steps of: molding a continuous strip member into a corrugated configuration while continuously delivering the member on a straight line in one direction, moving a cutter reciprocatively along said straight line, and bringing down the cutter at a cutting point during movement in the direction corresponding to the delivery direction of the continuous member, so as to obtain cuttings of a predetermined length from the continuous member while aligning the trough of the continuous member with the blade of the cutter and while synchronizing the delivery speed of the continous member with the speed of the cutter.

According to another aspect of the present invention, an apparatus for cutting continuous corrugated members is provided, which comprises rollers for molding a continuous corrugated member from a strip member, a tooth chain to be engaged with the continuous corrugated member from the molding rollers, means meshing with the chain to deliver the continuous corrugated member in a straight line, a cutter moved reciprocatively along the tooth chain, pulse signal generating means for generating electric pulse signals by detection of the number of crests of the delivered continuous member, a pulse motor driven by said pulse signals, a hydraulic motor driven by the pulse motor, means for horizontally and reciprocatively moving the cutter by converting the rotary movement from the hydraulic motor to a horizontal and reciprocative movement of the cutter, means for vertically and reciprocatively moving the cutter by converting the rotary movement from the hydraulic motor to a vertical and reciprocative movement of the cutter, and pulse supplying means for controlling supply of pulses to the pulse motor so that the continuous member is cut at a trough thereof so as to provide cuttings of a predetermined length.

DETAILED DESCRIPTION OF A PREFERRED EMBODIMENT

Figure 2:
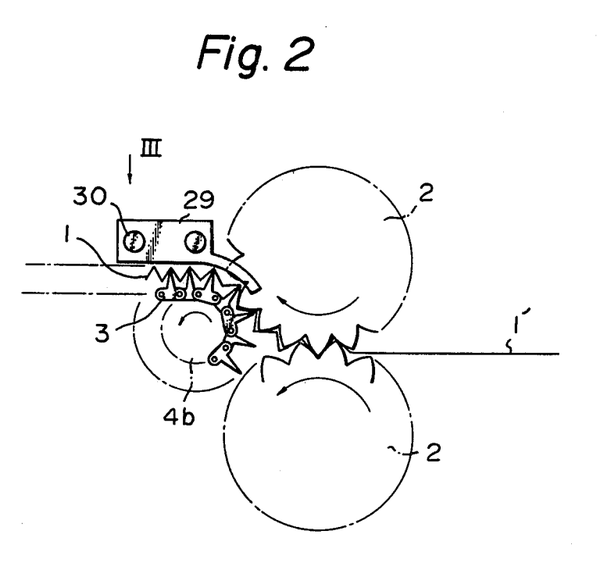
FIG. 2 is a diagram illustrating an intermediate portion between molding rollers and a tooth chain in the apparatus shown in FIG. 1.
Figure 3:
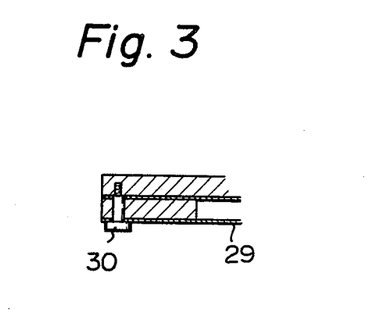
FIG. 3 is a view seen along the direction arrow 111 in FIG. 2.
Figure 4:
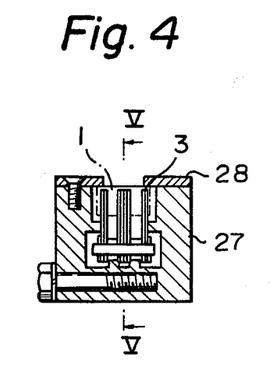
FIG. 4 is a cross-sectional view showing a fin delivery portion in the apparatus shown in FIG. 1.
Figure 5:
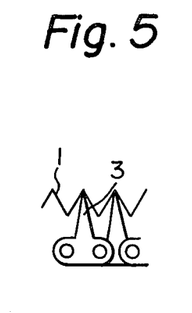
FIG. 5 is a view showing the section taken along the line V—V in FIG. 4, which illustrates the chain and the fin.

The present invention will now be described in detail with reference to the accompanying drawings. A continuous strip 1' is molded into a corrugated fin 1 between a pair of molding rollers 2. The fin 1 is fed in the direction indicated by arrow N while engaged with an endless chain 3 wound between a pair of sprockets 4a and 4b. The fin 1 is taken out by a pair of take-out rollers 32 only one of which is shown. In the vicinity of the molding rollers 2, a guide member 29 is secured above the chain 3 by a fixing pin 30 (FIGS. 2 and 3) so that the fin 1 can be positively transferred to the chain 3 from the molding rollers 2. A pair of spaced apart stationary guides 27 (FIG. 4) extend between the pair of sprockets 4a and 4b paralled to the chain 3. Thus, the chain 3, arranged between the pair of stationary sprockets 4a and 4b, is fed between the pair of stationary guides 27. A pressing plate 28 is disposed above said guides 27 to prevent the fin 1 from coming off from the chain 3 (FIGS. 4 and 5).

Figure 13:
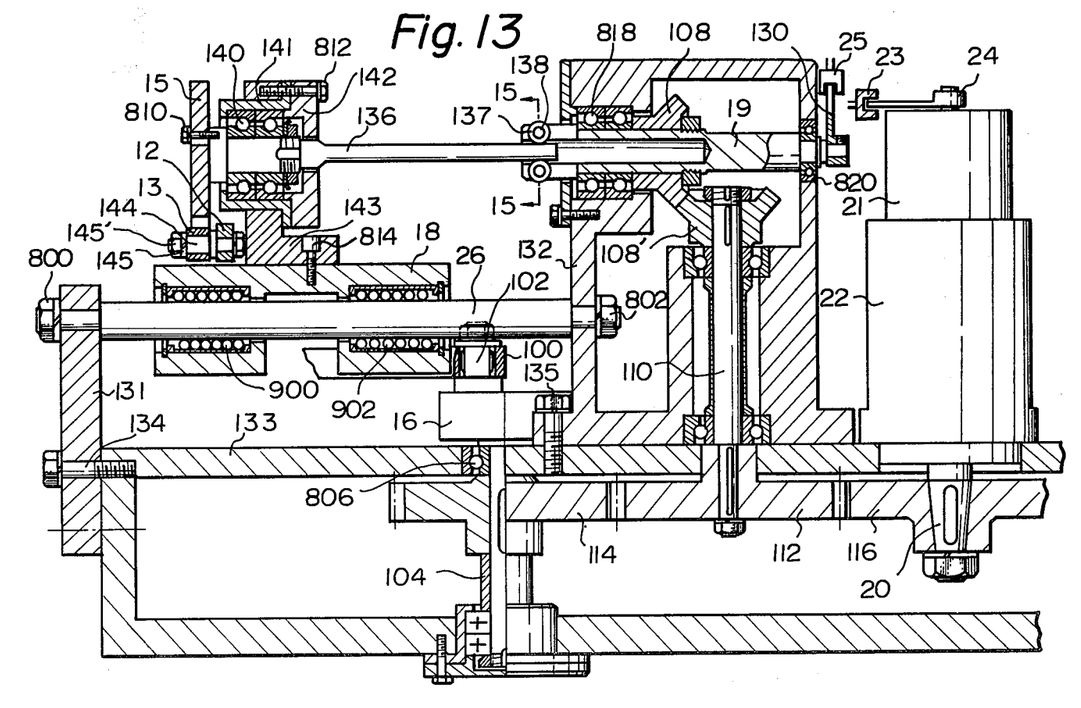
FIG. 13 is a cross sectional view taken along a line prallel to the direction of supply of fin in FIG. 1.

A cutter 10 for cutting the fin 1 at a predetermined length position is mounted on a carriage 18. The carriage 18 is by means of a pair of linear bearings 900 and 902 slidably fitted on two parallel guide shafts 26. The shafts 26 are on first ends connected to a holder 131 by respective nuts 800 and are on second end connected to a holder 132 by respective nuts 802 (FIG. 13). The holders 131 and 132 are connected to a box 133 by bolts 134 and 135, respectively. The carriage 18 has a rack portion 181 and which is screw connected by bolt 164 (FIG. 14) and which engages with a sector member 17 provided with toothed portion 17'. The sector member 17 is rotatable about a pin 171 and is connected to one end of a connecting arm 100 by a pin 172 and a bearing 149. The pin 171 is inserted to the member 17 via a bearing 152, and is connected to a base 150 fixedly connected to the box 133 by a bolt 804. The other end of the connecting arm 100 has a crank pin 102 which is engaged with a groove 16A extended in the radial direction on a disc 16 mounted on one end of a crankshaft 104 which is rotatable supported to the box 133 by a bearing 806. In this arrangement, rotation of the shaft 104 in the direction indicated by arrow X causes the carriage 18 to slide on the guides 26 and the cutter 10 to make a reciprocative movement along the course indicated by arrows P and Q.

The carriage 18 is provided with a lug 183 to which an oscillating lever 12 is rotatably mounted via a pin 121. The lever 12 has one end engaged with a cutter body 80 to which the cutter 10 is mounted. The cutter body 80 is vertically and slidably fitted to posts 11 and is always urged by a spring 14 mounted on the top end of the body 80 so that a roller 13 on the other end of the lever 12 abuts on a cam 15. The roller 13 is connected to the lever 12 by means of a pin 144, a washer 145 and a nut 145' (FIG. 13). In this arrangement, one rotation of the cam 15 causes the cutter 10 to make a rising and falling movement in the vertical direction as indicated by arrows R and S.

The cutter 15 is connected to one end of a slide shaft 136 by a nut 810. The slide shaft 136 is rotatably supported to a holder 143 by means of a pair of bearing 140 housed in a housing 141 which is connected to the holder 143 together with a cover 142 by means of a bolt 812. The holder 143 is, itself connected to the carriage by means of a bolts 814.

Figures 14, 15:
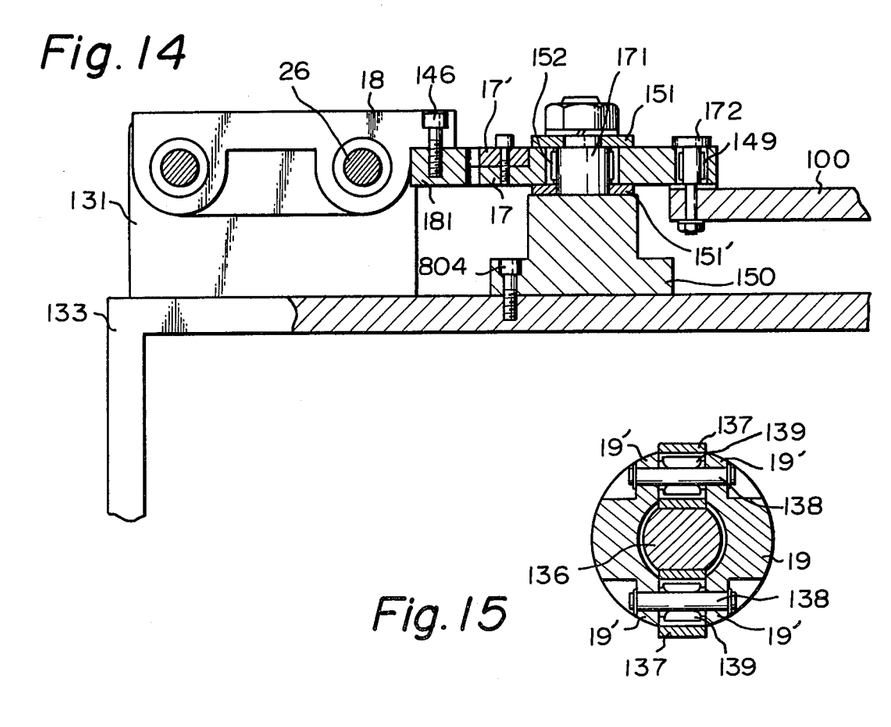
FIG. 14 is a cross sectional view taken along a line transverse to the direction of supply of fin in FIG. 1.
FIG. 15 is a cross sectional view taken along line 15 in FIG. 13.

A cam shaft 19 is rotatably mounted to the holder 132 by bearings 818 on one end and by a bearing 820 on the other end. The end of the slide shaft 136 spaced from the cutter 15 is partly inserted to the cam shaft 19. The cam shaft 19 has, on the end, a pair of diametrically spaced opposite flat surface abutting a pair of rings 137 (FIG. 15). The rings 137 are rotatably connected to ear portions 19' by means of bearings 139 and pins 138. Thus, a rotation of the cam shaft 19 is transmitted to the slide shaft 136 while permitting relative slide movement occuring between the cam shaft 19 and the slide shaft 136 when the carriage 18 moves along the shafts 26. The cam shaft 19 is connected to a countershaft 110 through gears 108 and 108'. A gear 112 on the countershaft 110 is engaged with gear 114 on the above-mentioned crankshaft 104 and with a gear 116 on an output shaft 20 of a hydraulic motor 22. In this arrangement, during one rotation of the hydraulic motor 22, one reciprocative movement P-Q in the horizontal direction and one reciprocative movement R-S in the vertical movement are made by the cutter 10.

Figure 6:
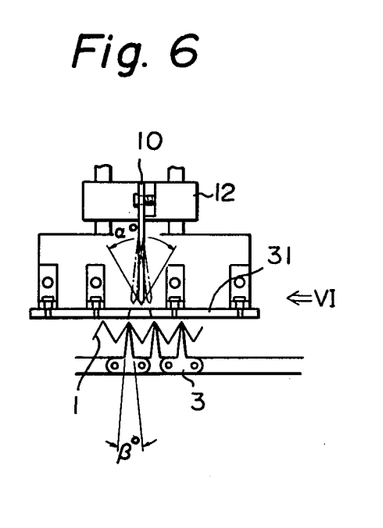
FIG. 6 is a diagram illustrating a cutter and a portion surrounding the cutter in the apparatus shown in FIG. 1.
Figure 7:
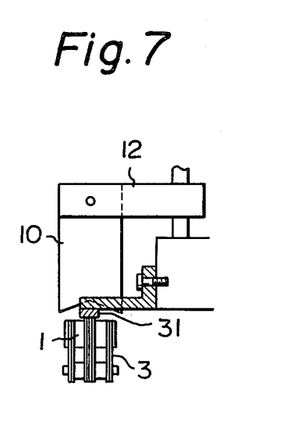
FIG. 7 is a view seen along the direction of arrow VI in FIG. 6.

A plate 31 is arranged in the vicinity of the cutter and having a hole 31' allowing the cutter 10 to pass to prevent the fin 1 from engaged out from the chain 3 during the cutting (FIGS. 6 and 7). The cutter 10 has an elastic property compensating for slight changes of the cutting position by elastic displacement to the left and right, as shown by phantom lines in FIG. 6. In order to prevent the blade of the cutter 10 from being damaged by interference of the tooth chain, the rake angle α of the blade is made larger than the crest angle β of the tooth chain. This arrangement prevents the blade from being damaged even if it falls in contact with the tooth chain.

An electric pulse motor 21 for supplying operating hydraulic pressure to the hydraulic motor 22 is arranged so that one rotation of the pulse motor 21 corresponds exactly to one rotation of the hydraulic motor 22. However, as described in detail hereinafter, the ratio of the rotation angle of the pulse motor 21 to the rotation angle of the hydraulic motor 22 is not exactly 1:1 because of influences of the load. In the present invention, even if there is an inconsistency between the angle of rotation of the pulse motor 21 and the angle of rotation of the hydraulic motor 22, pulses can be supplied to the pulse motor 21 so that the fin 1 is synchronized with the cutter 10 and the fin 1 is cut precisely at the position of the trough of fin 1.

Figure 1:
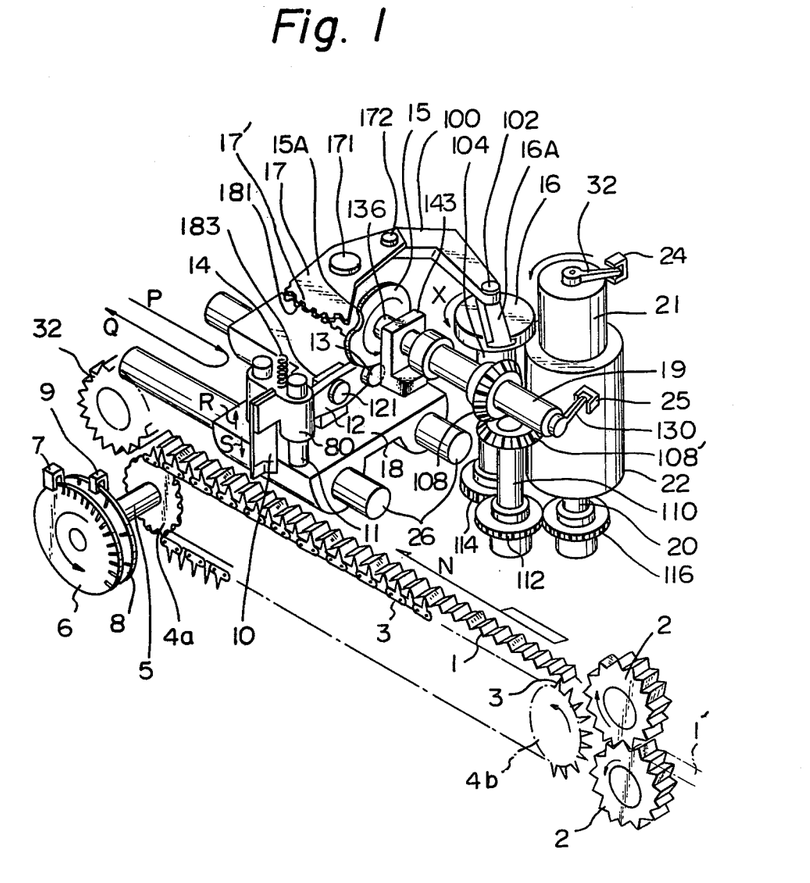
FIG. 1 is an perspective view showing the entire apparatus for cutting continuous corrugated members according to the present invention.

As shown in FIG. 1, slit discs 6 and 8 are coaxially arranged on the shaft 5 mounting the sprocket 4a. On one disc 6, there are formed grooves interspaced at angles corresponding to rotational angles of disc necessary to effect a movement of 1/6 pitch of the fin, one pitch of fin corresponding to one link of chain 3. A 50 pitch movement of the fin is effected every one rotation of the shaft 5, i.e., the disc 6. Thus 50×6 (=300) grooves are formed on disc 6. A light-electricity converting element 7 (below "fin pulse generator") is installed astride the disc 6. Thus, six pulses (below, "fin pulse signals") are generated from the generator 7 when fin 1 is moved by one pitch.

On the disc 8, there are formed grooves interspaced at angles corresponding to rotational angles of the disc necessary to effect a movement of 1 pitch of the fin. A second light-electricity converting element 9 (below, "fin trough pulse generator") is installed astride the disc 8. The arrangement is such that every time one trough of the fin 1 passes through the light-electricity converting element 9 one pulse (below, "fin trough pulse signals") is generated from the pulse generator 9. These pulse signals are fed to the electric pulse motor 21 to actuate the cutter 10 at the predetermined length position of the fin and effect the operation of cutting the fin.

Figure 8:
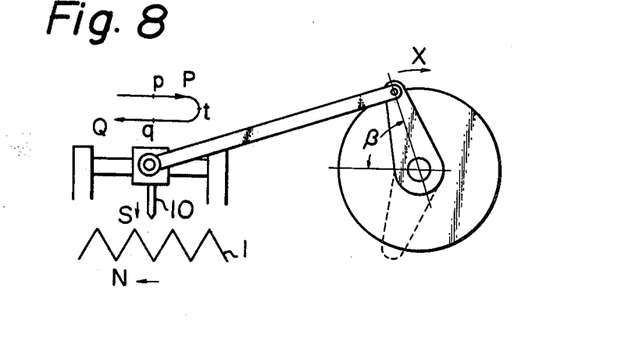
FIG. 8 is a model diagram showing a mechanism for driving the cutter horizontally and reciprocatively.
Figure 9:
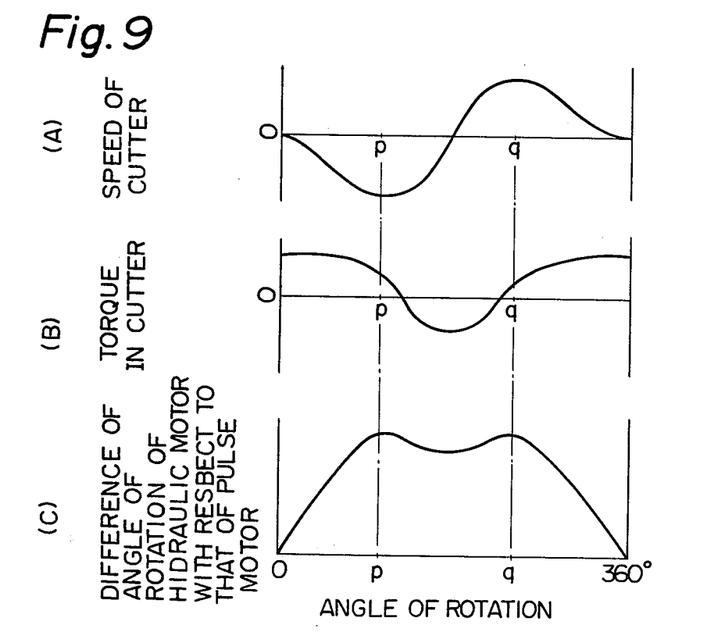
FIG. 9 is a diagram showing the characteristics of the model mechanism shown in FIG. 8.

A model of a crank mechanism (comprising disc 16 and crank pin 102 in embodiment shown in FIG. 1) for reciprocatively moving the cutter 10 in the horizontal direction, as indicated by arrows P and Q, is illustrated in FIG. 8. During one rotation of the crank in the direction indicated by arrow X, the cutter 10 makes one reciprocative movement in the horizontal direction. Accordingly, the fin 1 must be cut at the point where the cutter is moved in the same direction as the moving direction of the fin as indicated by arrow Q and where the speed of the cutter is the same as the speed of the fin. Such point is (below, "cutting point") indicated by q. At this cutting point q the blade of the cutter 10 is aligned with the trough of the fin 1. At this cutting point the cam follower roller 13 is also engaged with a recess 15A of the cam 15 shown in FIG. 1 so that the cutter 10 is brought down, as indicated by arrow S, by the spring force, whereby desired cutting of the fin 1 by the cutter 10 is accomplished. However, when the cutter 10 arrives at the dead point t of the horizontal reciprocative movement so as to start to move in the same direction as the moving direction of the fin, it is practically difficult to make the horizontal movement speed of the cutter equal to the speed of the fin, because the speed of the fin is high. This difficulty is overcome in the present invention according to the following procedures. It is noted that the same torque as the torque acting on the cutter 10 at the cutting point q inevitably appears while the cutter is moved in the direction opposite to the moving direction of the fin as indicated by arrow P. Therefore, if the blade of the cutter 10 is aligned with the trough of the fin at this point p (below, "correcting point"), the blade of the cutter 10 always aligns with the trough of the fin at the cutting point q. More specifically, in the model of the crankshaft of the cutter shown in FIG. 8, the speed of the cutter 10 is changed as shown in FIG. 9-A. As shown in FIG. 9-B, the torque at the point q where the speed of the fin is equal to the speed of the cutter is the same as the load torque at the correcting point p. Therefore, as shown in FIG. 9-C, the difference of rotational angle of the hydraulic motor 22 to that of the pulse motor 21 is quite the same at both the points q and p. Accordingly, if the blade of the cutter 10 is aligned with the trough of the fin 1 at the correcting point p, the blade of the cutter 1 always aligns with the trough of the fin 1 at the point q.

For detecting this correcting point p, a dog 130 is mounted on the shaft 19 shown in FIG. 1. The dog 130 is arranged adjacent the light-electricity converting element 25 so that a signal indicating that the blade of the cutter 10 arrives at the correcting point p is generated from these elements 25.

Figure 10:
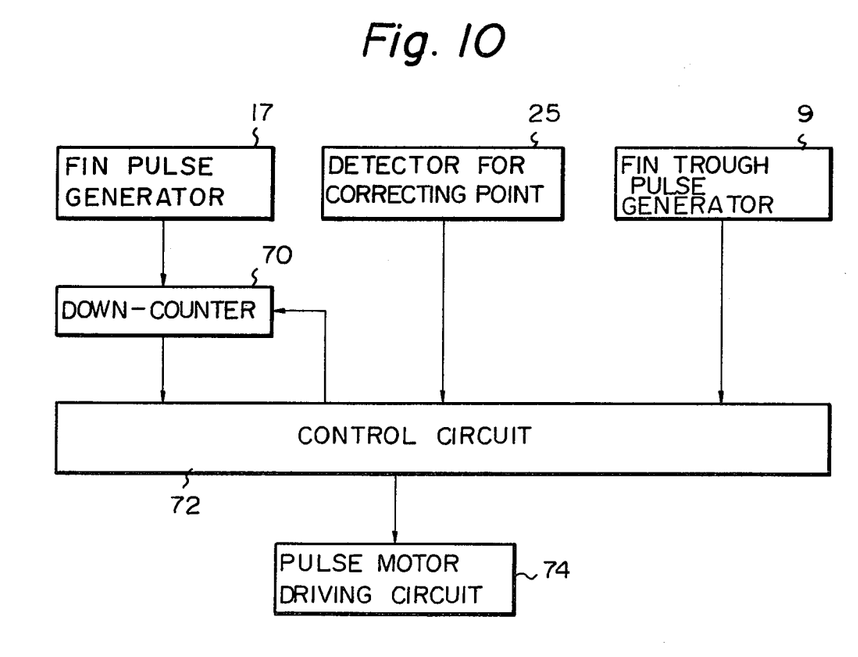
FIG. 10 is a block diagram of a system for operating the apparatus.

In FIG. 10, pulse signals from the light-electricity converting element 7 are received by a counter circuit 70 and are processed according to procedures described below to cut the fin at the predetermined length position.

Figure 11:
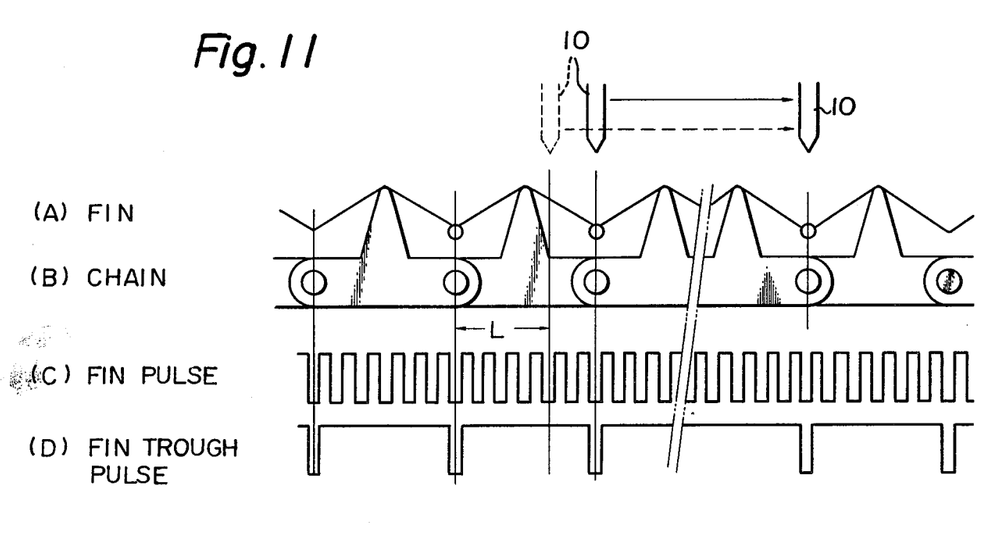
FIG. 11 is a model diagram illustrating the phase-mating operation between the cutter and the trough of the fin according to the present invention.

While the fin is being delivered, six pulses are put out from the fin pulse generator 9 for every pitch of the fin 1 (FIG. 11(c)). The number of the pulses is counted by a down counter 70 (FIG. 10). The set pulse value of the down-counter 70 is equal to the value obtained by subtracting the number of total pulses generated from the pulse generator 7 during one rotation of the slit disc 6 (300 pulses (=50 crests×6 pulses) in the present embodiment) from the number of pulses corresponding to the cut length of the fin (in the present embodiment, since six pulses are generated for every crest, this pulse number is obtained by multiplying the number of necessary crests by 6). Accordingly, before the slit disc 6 makes one rotation just before cutting, no output appears from the counter 70. Therefore the control circuit 72 does not operate a pulse motor driving circuit 74, with the result that the pulse motor 71 is not rotated. At this time, the pulse motor 21 is located at the original position, the hydraulic motor 22 connected to the pulse motor 21 is located at the original position, and the carriage 18 is located at the innermost position in FIG. 1. This original position is confirmed by the dog 32 on the pulse motor shaft arranged between a pair of light-electricity converting elements 24.

Figure 12:
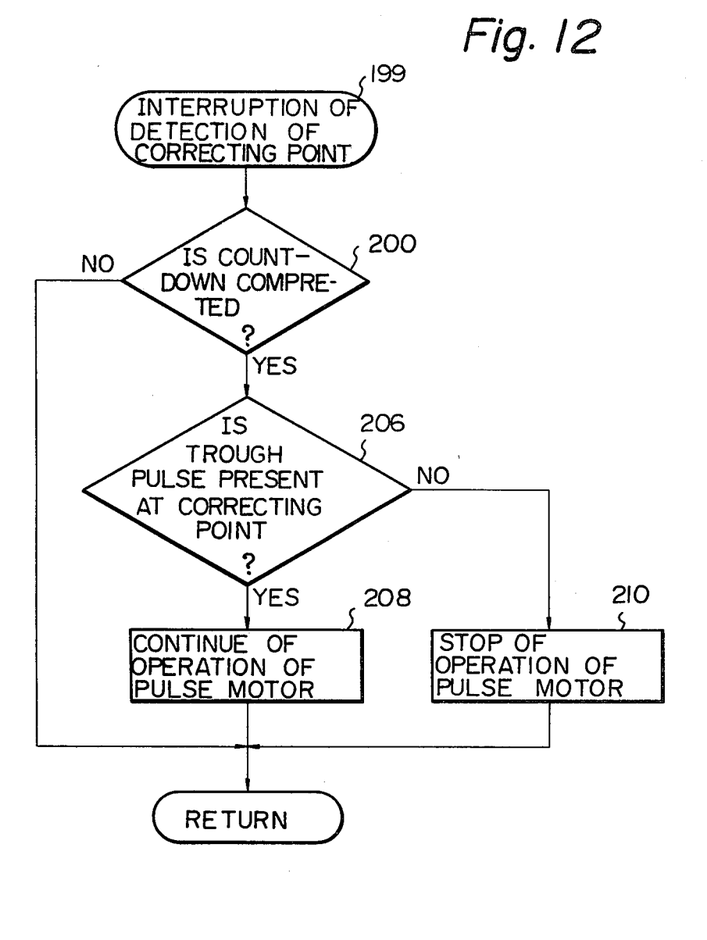
FIG. 12 is a flow chart indicating the routine effected at the control circuit in FIG. 10 for the phase mating operation.

When the slit disc 6 starts the last one rotation corresponding to 300 pulses from the generator 7, the down-counter 70 is operated to transmit the signals from the generator 7 to the pulse motor 21 through the control circuit 72 and the pulse motor driving circuit 74. Thus, the hydraulic motor 22 starts to rotate to cause the carriage 18 to move in the direction P opposite to the moving direction of the fin 1. Simultaneously, the cam 15 is rotated. Since the cam 15 does not reach the recess 15A, however, the cutter is maintained at the elevated position. When the angular position of the shaft 19 becomes equal to the correcting point p, the signal from the light-electricity converting elements 25 is input in the control circuit 72. At this time, the control circuit 72 enters into a program shown in FIG. 12 at point 199 so as to effect a routine for the phase-mating operation according to the present invention. More specifically, at point 200, a flag indicating whether or not the count-down operation of the down-counter 70 is completed is judged. If the count-down operation is completed (YES), the program proceeds to the point 206 to determine whether or not the pulse signal from the fin trough pulse generator 9 is input. FIG. 11-(A) shows the fin 1, FIG. 11-(B) shows a chain, FIG. 11-(C) shows the fin pulses from the pulse generator 7, and FIG. 11-(D) shows the pulses from the pulse generator 9, (as described hereinbefore, six pulses C are generated for every crest of the fin and one pulse D is generated for every trough of the fin). When the cutter 10 arrives at the correcting point p, the relative position of the cutter 10 to the fin is such that the cutter is in alignment with the trough of the fin, as indicated by the solid line in FIG. 11, or the cutter is not in agreement with the trough of the fin, as indicated by the broken line in FIG. 11. If the relative position of the cutter to the fin corresponds to the trough of the fin, as indicated by the solid line in the model diagram of FIG. 11, as in the former case (the judgement at the point 206 in FIG. 12 is YES), the program in FIG. 12 proceeds to point 208 to continue rotation of the pulse motor 21. The blade of the cutter 10 aligns with the trough of the fin at the cutting point for the reasons set forth hereinbefore.

When the cutter 10 is not in alignment with the trough of the fin as in the latter case (the judgement at point 206 in FIG. 12 is NO), the program in FIG. 12 proceeds to the point 210 to stop the supply of the pulses. Therefore, rotation of the pulse motor is stopped until the subsequent fin trough pulse is received for allowing the movement of fin of length L shown in FIG. 11. By this arrangement, the cutter can be aligned with the trough of the fin at the correction point. Thus, the phase mating at the cutting point can be accomplished.

As will be apparent from the foregoing description, according to the present invention, adoption of the above-mentioned system in which a fin is delivered by a tooth chain and a pulse motor is employed enables the increase of the cutting speed to a level six to eight times as high as the cutting speed attainable according to the conventional technique.

Furthermore, the required number of fin crests can easily be changed only by changing the set value of the counter. Thus high-speed automatic change of the cut length becomes possible.

Moreover, the shape of the cutter can be simplified without use of a lower mold, with the result that the manufacturing cost can be reduced and the change time can be shortened.

Many modification and changes may be made by those skilled in the art without departing from the scope of the invention.

We claim:

1. A method of forming corrugated members comprising the steps of:
   delivering a continuous strip of material in a straight line while forming the strip into a corrugated configuration having a plurality of crests and troughs;
   moving a cutting assembly in a reciprocating path along said straight line;
   aligning the cutter assembly with a trough of the formed corrugated member at a point along the path of the cutter where the speed of the cutter is equal to the speed of the corrugated member while the cutter is moving in a direction opposite the corrugated member;
   actuating the cutter while moving in the same direction as the corrugated member at the same point on the cutter path as the aligning point so as to cut the corrugated member at the trough.

2. A method for cutting continuous corrugated members according to claim 1, wherein the alignment of the blade of the cutter with the trough of the continuous member is accomplished by temporarily stopping the movement of the cutter or decreasing the speed of the movement.

3. A method for cutting continuous corrugated members according to claim 1, wherein the continuous corrugated member is a louver-forming corrugated fin for a heat exchanger.

4. An apparatus for cutting continuous corrugated members, which comprises rollers for molding a continuous corrugated member from a strip member, a tooth chain to be engaged with the continuous corrugated member from the molding rollers, means meshing with the chain to deliver the continuous corrugated member in a straight line, a cutter reciprocating along the tooth chain, pulse signal generating means for generating electric pulse signals responsive to the detection of crests and/or troughs of the delivered continuous member, a pulse motor driven by said pulse signals, a hydraulic motor driven by the pulse motor, means for horizontally and reciprocating the cutter by converting the rotary movement from the hydraulic motor to a horizontal and reciprocating movement of the cutter, means for vertically and reciprocating the cutter by converting the rotary movement from the hydraulic motor to a vertical and reciprocating movement of the cutter, a sensor disposed to detect, when the cutter is moved in the direction opposite to the moving direction of the corrugated member, a correcting point where the load in the cutter is same as the load at a cutting point where the cutter is synchronously moved with the corrugated member, and control means responsive to the signal from the sensor and from the pulse signal generating means for control of the supply of pulses from the pulse signal generating means to the pulse motor so that the cutter is aligned with the trough of the continuous member at the correcting point.

5. An apparatus for cutting continuous corrugated members according to claim 4, wherein said means for moving the cutter horizontally and reciprocally comprises a carriage supporting the cutter thereon and a crank mechanism for connecting the hydraulic motor to said carriage.

6. An apparatus for cutting continuous corrugated members according to claim 5, wherein the crank mechanism comprises a shaft connected to the hydraulic motor, a crank pin engaged with a groove formed and extended in the radial direction on said shaft, an oscillating crank arm, and a sector wheel connected on said crank arm and rotatably mounted to a pin on a machine frame, said sector wheel being engaged with the carriage.

7. An apparatus for cutting continuous corrugated members according to claim 5, wherein the vertically and reciprocally driving means comprises an oscillating lever connected to the cutter and mounted on the carriage, a cam follower roller mounted on the oscillating lever, a cam roller engageable with the cam follower roller, a gear mechanism connected to the hydraulic motor, and means for connecting the cam roller to the gear mechanism to transmit the rotation of the motor to the cam roller during the slide motion of the carriage.

8. An apparatus according to claim 7, wherein said means for connecting the cam roller to the gear mechanism comprise a first shaft fixedly connected to the cam roller, a second shaft fixedly connected to the gear mechanism, and coupling means for connecting the first and second shafts with each other in sense of rotation while allowing a relative slide movement between the first and the second shafts.

9. An apparatus according to claim 8, wherein one of said shafts has at least one flat portion, and said coupling means comprise at least one ring rotatably connected to the other one shaft, said ring contacting with the flat portion.

10. An apparatus for cutting continuous corrugated members according to claim 4, wherein said sensor comprises a dog mounted on the camshaft at a position corresponding to a predetermined position of the cutter and a light-electricity converting element which is selectively opened and closed to generate an electric signal.

11. An apparatus for cutting continuous corrugated members according to claim 10, wherein said pulse signal generating means comprises a first pulse generator for generating a plurality of pulses for every predetermined number of crests of the corrugated member and a second pulse generator for generating one pulse for every trough of the corrugated member, and wherein said control means comprises counter means for stopping supply of pulses from the first sensor to the pulse motor to stop the operation of the cutter until the number of pulses generated from the first pulse generator reaches the value obtained by substracting the number of pulses of one pitch of the continuous member from the number of pulses corresponding to the predetermined length of the continuous member, and means for stopping supply of pulses from the sensor to stop the operation of the cutter until a signal of the second pulse generator is received by the control means at the correcting point detected by said sensor even if the number of pulses from the first pulse generator has reached said value.

12. An apparatus for cutting continuous corrugated members according to claim 11, wherein the first pulse generator comprises a slit plate mounted to rotate together with the chain on which the tooth chain is wound and a light-electricity converting element nipping said slit plate therein, and a plurality of slits are formed on said slit plate for every pitch of the corrugated member.

13. An apparatus for cutting continuous corrugated members according to claim 12, wherein six slits are formed for every crest of the corrugated member.

14. An apparatus for cutting continuous corrugated members according to claim 11, wherein the second pulse generator comprises a slit plate mounted to rotate together with the chain and a light-electricity converting element nipping said slit plate therein, and one slit is formed on the slit plate for every trough of the corrugated member.

15. An apparatus for cutting continuous corrugated members according to claim 4, further comprising a guide arranged in the vicinity of the molding rollers to guide the continuous corrugated member to the tooth chain.

16. An apparatus for cutting continuous corrugated members according to claim 4, wherein said means meshing with the chain comprises a pair of sprockets wound in an endless manner.

17. An apparatus for cutting continuous corrugated members according to claim 16, further comprising a guide disposed to guide the continuous corrugated member between the sprockets.

18. An apparatus for cutting continuous corrugated members according to claim 4, further comprising a plate disposed to prevent a fin from jumping out when the cutting operation is performed by the cutter.

19. An apparatus for cutting continuous corrugated members according to claim 4, wherein the cutter has an elastic property.

20. An apparatus for cutting continuous corrugated members according to claim 4, wherein the rake angle of the cutter is larger than the crest angle of the corrugated member.

21. An apparatus for cutting continuous corrugated members according to claim 4, wherein the continuous corrugated member is a corrugated fin for a heat exchanger.

22. An apparatus for cutting continuous corrugated member according to claim 4, further comprising a plate located slightly above the fin being conveyed, said plate having a hole through which the cutter is introduced during the vertical reciprocating motion, said plate being adapted for preventing the fin to be engaged out of chain.

* * * * *